United States Patent [19]

Ludwig

[11] 4,142,677
[45] Mar. 6, 1979

[54] FUEL VAPOR VENT VALVE

[75] Inventor: George C. Ludwig, Owosso, Mich.

[73] Assignee: Tom McGuane Industries, Inc., Madison Heights, Mich.

[21] Appl. No.: 810,079

[22] Filed: Jun. 27, 1977

[51] Int. Cl.² .................................................. F10K 24/04
[52] U.S. Cl. ............................... 236/101 E; 236/48 R; 137/468; 251/367
[58] Field of Search .................... 236/48, 101 E, 93 R, 236/101; 137/468, 843; 285/21, DIG. 22; 251/366, 367

[56] References Cited

U.S. PATENT DOCUMENTS

| | | | |
|---|---|---|---|
| 3,051,509 | 8/1962 | Wilton | 285/21 |
| 3,417,768 | 12/1968 | Wasson | 137/843 X |
| 3,807,445 | 4/1974 | McPhee | 137/843 X |
| 3,889,710 | 6/1975 | Brost | 137/843 X |
| 3,930,613 | 1/1976 | Place | 236/101 R X |
| 4,068,800 | 1/1978 | Doherty | 236/87 X |

Primary Examiner—Alan Cohan
Attorney, Agent, or Firm—Barnes, Kisselle, Raisch & Choate

[57] ABSTRACT

A fuel vapor vent valve comprising a plastic body including a base wall and a peripheral wall and a plastic cap including a base wall and a peripheral wall surrounding the peripheral wall of the plastic body. The peripheral wall of the base has a radially outwardly extending annular rib and the peripheral wall of the cap has a radially inwardly extending rib. The ribs are adapted to pass over one another to provide a snap fit during assembly. The base wall of the body has integral O-ring retaining means for retaining an O-ring. A bimetallic disc is positioned in said body within the confines of the peripheral wall of the body and normally engages said O-ring. Integral stop means on the cap are adapted to be engaged by the bi-metal disc when the disc is caused to move to a position out of engagement with the O-ring upon increase of the ambient temperature.

13 Claims, 6 Drawing Figures

U.S. Patent  Mar. 6, 1979  4,142,677
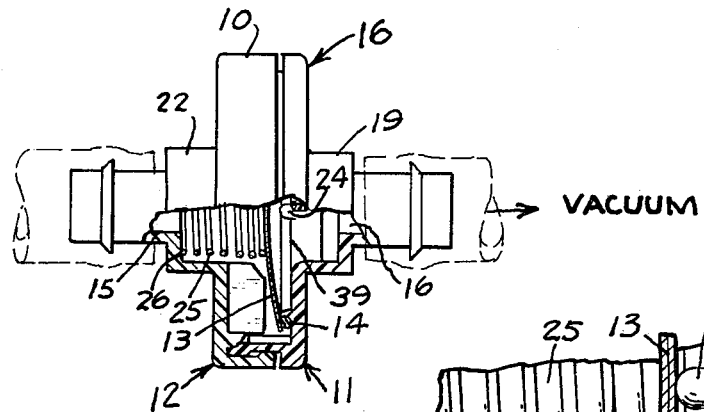
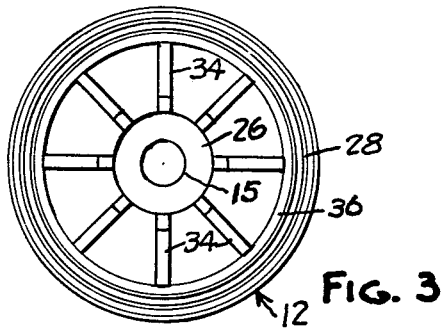
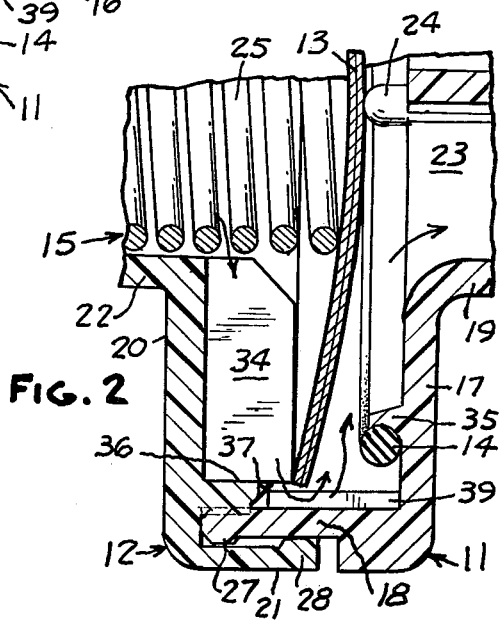
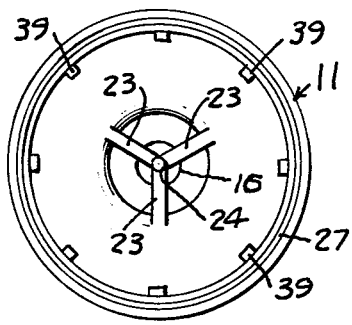
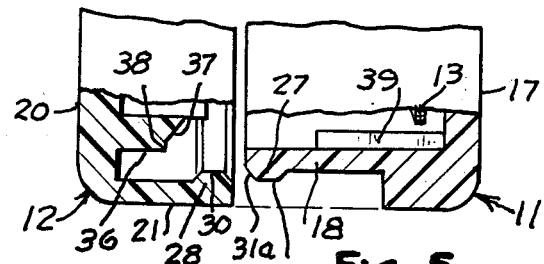
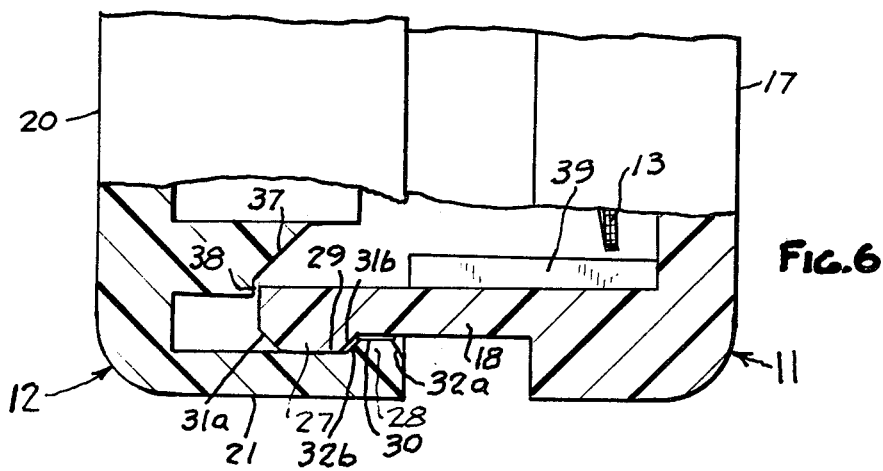

FUEL VAPOR VENT VALVE

This invention relates to fuel vapor vent valves.

BACKGROUND AND SUMMARY OF THE INVENTION

In automotive vehicles and the like, it has been more recently recommended that the fuel systems be sealed. However for safety reasons, it is desirable to provide a vapor collecting canister which should be periodically vented to the intake manifold as a function of ambient temperature. For example, one manufacturer recommends that the valve be closed at temperatures less than 100° F. and open at temperatures above 130° F.

The present invention is directed to a fuel vapor vent valve which will function to vent the fuel line in accordance with such requirements; which is relatively simple to manufacture; which can be preassembled for testing before final placement in sealed condition; and which utilizes parts that can be manufactured at relatively low cost and be readily handled.

In accordance with the invention, the fuel vapor vent valve comprises a plastic body including a base wall and a peripheral wall and a plastic cap including a base wall and a peripheral wall surrounding the peripheral wall of the plastic body. The peripheral wall of the base has a radially outwardly extending annular rib and the peripheral wall of the cap has a radially outwardly extending rib which are adapted to pass over one another to provide a snap fit during assembly. The base wall of said body having integral O-ring retaining means for retaining an O-ring. A bi-metallic disc is positioned in the body within the confines of the peripheral wall of the body and normally engages the O-ring. Integral stop means on said cap are adapted to be engaged by the bi-metal disc when the disc is caused to move to a position out of engagement with the O-ring upon increase of the ambient temperature.

DESCRIPTION OF THE DRAWINGS

FIG. 1 is a part sectional view of a fuel vapor vent valve embodying the invention.

FIG. 2 is a fragmentary sectional view on an enlarged scale showing the parts in a different operative position.

FIG. 3 is a view taken axially of the cap of the fuel vent valve.

FIG. 4 is a view taken axially of the body of the fuel vent valve.

FIG. 5 is a fragmentary part sectional view showing the parts prior to assembly.

FIG. 6 is a fragmentary part sectional view showing the parts during intermediate assembly for pretesting.

DESCRIPTION

Referring to FIG. 1, the fuel vent valve 10 embodying the invention comprises a body 11 and a cap 12 that is snapped over a portion of the body 11 as presently described. The fuel vent valve includes a bi-metallic disc 13 that normally seals against an O-ring 14 but functions to move away from the seal 14 when the ambient temperature rises above a predetermined value so that venting may occur from the axial passage 15 in the cap to the axial passage 16 in the body.

The body 11 and cap 12 are preferably made of plastic such as nylon which is reinforced with glass fibers. A preferred plastic is ZYTEL 103, a nylon made by E. I. duPont de Nemours and Company, having 13% glass fiber reinforcement.

As shown in FIG. 2, the body 11 includes a base wall 17 and a peripheral wall 18 and an axial portion of reduced diameter 19 which extends from the center of the base wall 17.

The cap 12 includes a base wall 20, a peripheral wall 21 and an axial portion 22 which defines the opening 15.

Integral webs 23 in the portion 19 of the body 11 extend radially and support an axial protrusion 24 which is engaged by the bi-metallic disc 13. A spring 25 is interposed between the disc 13 and a shoulder 26 in the cap 12.

The wall 18 of the body 11 and the wall 21 of the cap 12 have ribs 27, 28 each of which has an axial surface 29, 30 and beveled or inclined surfaces 31a, 31b, and 32a, 32b.

The cap 12 further includes radially extending walls 34 that function as stop means for limiting the movement of the bi-metallic member 13 when the temperature is elevated and the bi-metallic member moves away from the O-ring 14. An integral annular lip 35 on the inner surface of the base wall 17 retains the O-ring in position.

The cap 12 further includes an annular wall 36 that extends axially and is spaced radially inwardly of the peripheral wall 21. The wall 36 includes an inclined surface 37 and an intermediate stop or shoulder 38.

In assembly, the parts are brought into position with the disc 13 engaging the O-ring 14 and the spring 25 in the recess defined by the portion 26 of the cap. The parts are then telescoped together with the wall 21 telescoping over the wall 18 and the ribs 27, 28 snapping over to frictionally hold the parts together in the position shown in FIG. 6. In this relationship, the fuel vent valve can be tested to determine proper operation. If misalignment or misassembly is indicated, the parts can be pried apart for proper assembly. After this testing, an axial force is applied to the body and cap and at the same time ultrasonic energy is applied bringing the free end of the wall 18 into engagement with the intermediate stop 38. Engagement is continued to fuse the wall 18 with the wall 36 and bring the end of the wall 18 into engagement with the base wall 20 of the cap.

In operation, the opening 15 is connected to the vapor collecting canister while the opening 16 is connected to the intake of the carburetor or intake manifold. When the temperature exceeds a predetermined amount, for example, 130° F., the disc 13 snaps to the position shown in FIG. 2, permitting venting of the fumes as shown by the arrows through the opening 15 past the periphery of the disc 13 and out through the opening 16. In order to insure proper passage, axial ribs 39 are provided on the inner surface of the wall 18 and the diameter circumscribed by the inner portions thereof is greater than the periphery of the disc 13 to insure proper passage of the fumes.

I claim:

1. A fuel vapor vent valve comprising
a plastic body including a base wall and a peripheral wall,
a plastic cap including a base wall and a peripheral wall surrounding the peripheral wall of the plastic body,
said peripheral wall of said body having a radially outwardly extending annular rib,
said base walls having openings therein, said peripheral wall of said cap having a radially inwardly extending rib, said ribs being adapted to pass over one another to provide a snap fit during assembly, said base wall of said body having integral O-ring retaining means, an O-ring retained by said integral means, a bi-metallic disc positioned in said body within the confines of said peripheral wall of said body and normally engaging said O-ring, integral stop means on said cap adapted to be engaged by said bi-metal disc when said disc is caused to move to a position out of engagement with said O-ring upon increase of the ambient temperature, said peripheral wall of said body and said peripheral wall of said cap being ultrasonically welded to one another, said peripheral wall of said body engaging the base wall of said cap.

2. The combination set forth in claim 1 wherein said stop means comprises a plurality of radially extending webs in said cap.

3. The combination set forth in claim 1 including spring means extending from the base wall and bearing against said bi-metallic disc.

4. The combination set forth in claim 1 including an integral axial projection on said base wall of said body engaged by said bi-metallic disc.

5. The combination set forth in claim 1 including a recess integral in the base wall of said cap for receiving one end of said spring.

6. The combination set forth in claim 1 wherein said openings in said base wall of said body and said caps are axially aligned.

7. The combination set forth in claim 1 wherein each of said ribs on said peripheral walls of said body and said cap have an axial portion and beveled edge portions.

8. The combination set forth in claim 1 wherein said cap includes a second wall radially inwardly of said peripheral wall which includes a portion that is inclined outwardly toward the base wall of said cap.

9. The combination set forth in claim 1 including circumferentially spaced axially extending ribs on the inner surface of the peripheral wall of said body, the diameter of said disc being less than the diameter circumscribed by the inner edges of said axially extending ribs.

10. A fuel vapor vent valve comprising a plastic body including a base wall and a peripheral wall, a plastic cap including a base wall and a peripheral wall surrounding the peripheral wall of the plastic body, axially aligned openings in said base wall of said body and said caps, said peripheral wall of said body having a radially outwardly extending annular rib, said peripheral wall of said cap having a radially inwardly extending rib, said ribs being adapted to pass over one another to provide a snap fit during assembly, said base wall of said body having integral O-ring retaining means, an O-ring retained by said integral means, a bi-metallic disc positioned in said body within the confines of said peripheral wall of said body and normally engaging said O-ring, spring means extending from the base wall of said cap and bearing against said bi-metallic disc, a recess integral in the base wall of said cap for receiving one end of said spring, integral stop means on said cap adapted to be engaged by said bi-metal disc when said disc is caused to move to a position out of engagement with said O-ring upon increase of the ambient temperature, said stop means comprising a plurality of radially extending webs in said cap, an integral axial projection on said base wall of said body engaged by said bi-metallic element, said peripheral wall of said body and said peripheral wall of said cap being ultrasonically welded to one another, said peripheral wall of said body engaging the base wall of said cap.

11. The combination set forth in claim 10 wherein each of said ribs on said peripheral walls of said body and said cap have an axial portion and beveled edge portions.

12. The combination set forth in claim 10 wherein said cap includes a second wall radially inwardly of said peripheral wall of said cap which includes a portion that is inclined outwardly toward the base wall of said cap.

13. The combination set forth in claim 10 including circumferentially spaced axially extending ribs on the inner surface of the peripheral wall of said body, the diameter of said disc being less than the diameter circumscribed by the inner edges of said axially extending ribs.

* * * * *